(12) United States Patent
Elmore et al.

(10) Patent No.: US 7,004,405 B1
(45) Date of Patent: Feb. 28, 2006

(54) SYRINGE UNIT

(76) Inventors: Scott Elmore, 1515 Universal Rd., Jefferson City, TN (US) 37760; Kevin Pierce, R.R. #1, Grand Forks, ND (US) 58201

( * ) Notice: Subject to any disclaimer, the term of this patent is extended or adjusted under 35 U.S.C. 154(b) by 0 days.

(21) Appl. No.: 10/755,611

(22) Filed: Jan. 12, 2004

(51) Int. Cl.
*A62C 5/02* (2006.01)

(52) U.S. Cl. .................. 239/310; 239/172; 239/198; 239/569; 239/195; 239/197; 137/355.12

(58) Field of Classification Search ............... 239/146, 239/172, 175, 195, 197, 198, 310, 569, 570; 137/268, 355.12, 355.19
See application file for complete search history.

(56) References Cited

U.S. PATENT DOCUMENTS 2,293,796 A * 8/1942 Bestor ................. 137/599.14
4,238,074 A * 12/1980 Coons ..................... 239/745
4,967,960 A * 11/1990 Futrell ..................... 239/148
5,622,319 A * 4/1997 Babb et al. ............... 239/722
5,816,499 A * 10/1998 Christiansen ............. 239/198

* cited by examiner

*Primary Examiner*—Dinh Q. Nguyen
(74) *Attorney, Agent, or Firm*—Robert E. Kleve

(57) ABSTRACT

The invention comprises a golf course treatment platform having a frame with a spool of garden hose wound onto the spool, control piping on the platform, and a chemical tank whereby water may be introduced into the control piping a valved directly into the garden hose whereupon the water may be directed by the hose onto the golf course for treating the course with water or the water in the control piping may be valved through a mixing chamber to mix the water with a chemical from the tank and then directed into the garden hose on the spool where the mixture may be directed by the hose onto the golf course for treating the course with a water and chemical mixture, said platform having adjustable engaging means for adjustably mounting the platform to a trailer for transporting the platform on the golf grounds.

2 Claims, 5 Drawing Sheets

SYRINGE UNIT

This invention relates to portable spraying equipment for using in treating golf course for spraying chemicals and the like onto the courses.

By way of background, it is customary for golf courses to have numerous water spigots protruding from the courses at spaced intervals along the golf course, for the golf course maintenance operators to tap into for water when treating the course to maintain the grounds.

It is an object of the invention to provide a novel portable spraying apparatus which can be easily and detachably mounted to a wheeled vehicle to moved to different locations on a golf course to attach to a selected water outlet on the course to spray a water or water and chemical mixture on the golf grounds.

It is a further object of the invention to provide a novel portable golf course liquid treatment apparatus which can apply water or a chemical mixture with water to the golf course with the apparatus having a water driven chemical mixture apparatus powered by the water pressure to selectively mix a chemical with the water and apply the mixture to the course.

It is another object of the invention to provide novel portable apparatus for liquid treatment of golf courses grounds.

Further objects and advantages of the invention will become apparent as the description proceeds and when taken in conjunction with the accompanying drawings wherein:

BRIEF DESCRIPTION OF PREFERRED EMBODIMENT

Briefly stated, the invention comprises a portable liquid treatment platform having a spool mounted to the platform with a reel of hose wound thereon, a chemical tank and mixing chamber is mounted to the platform and control piping and an attachment to a water outlet for the branch control piping and a valve to direct the water from the outlet through a branch directly into the reel of hose so that the hose may be unwound to apply water from the outlet through the hose onto the course, or to direct the water from the outlet through a branch through the mixing chamber wherein the pressure of the water may drive the injection or mixing of the chemical with the water with piping to direct the mixture into the reel of hose so that the water chemical mixture may applied through the hose onto the course.

Figure 1:
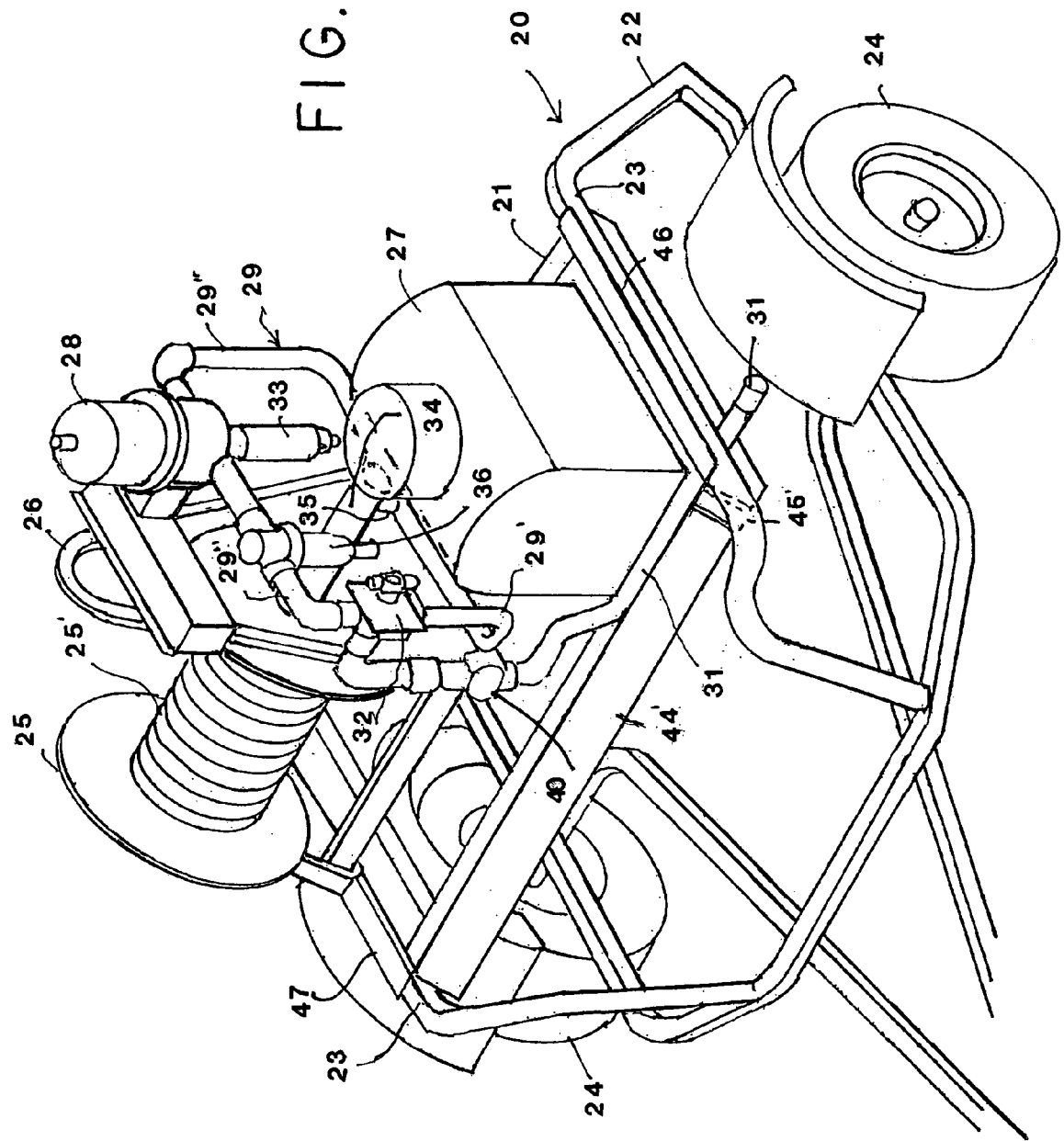
FIG. 1 is a perspective view of the novel water chemical spraying invention.
Figure 2:
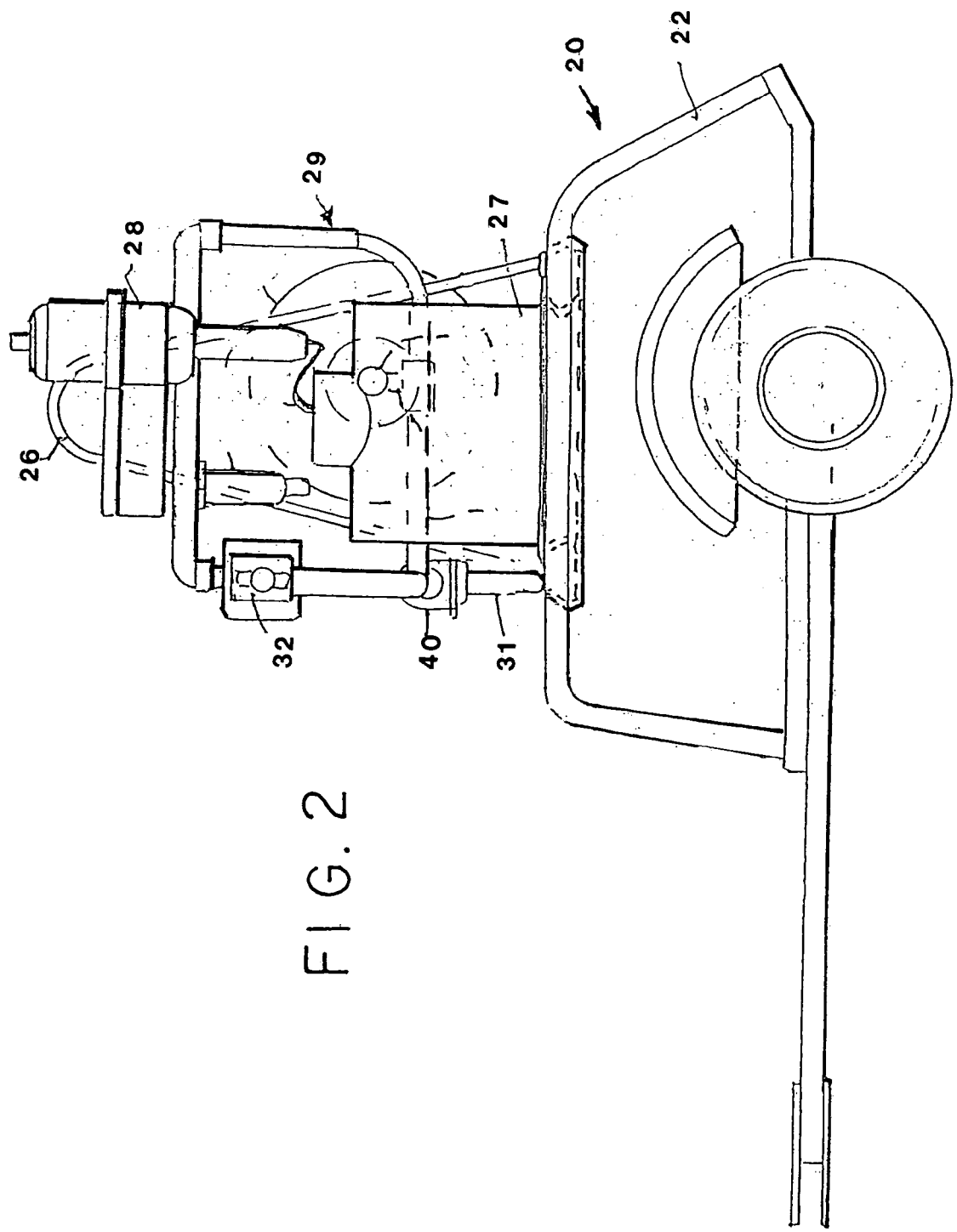
FIG. 2 is a side elevational view of the water chemical spraying invention.
Figure 3:
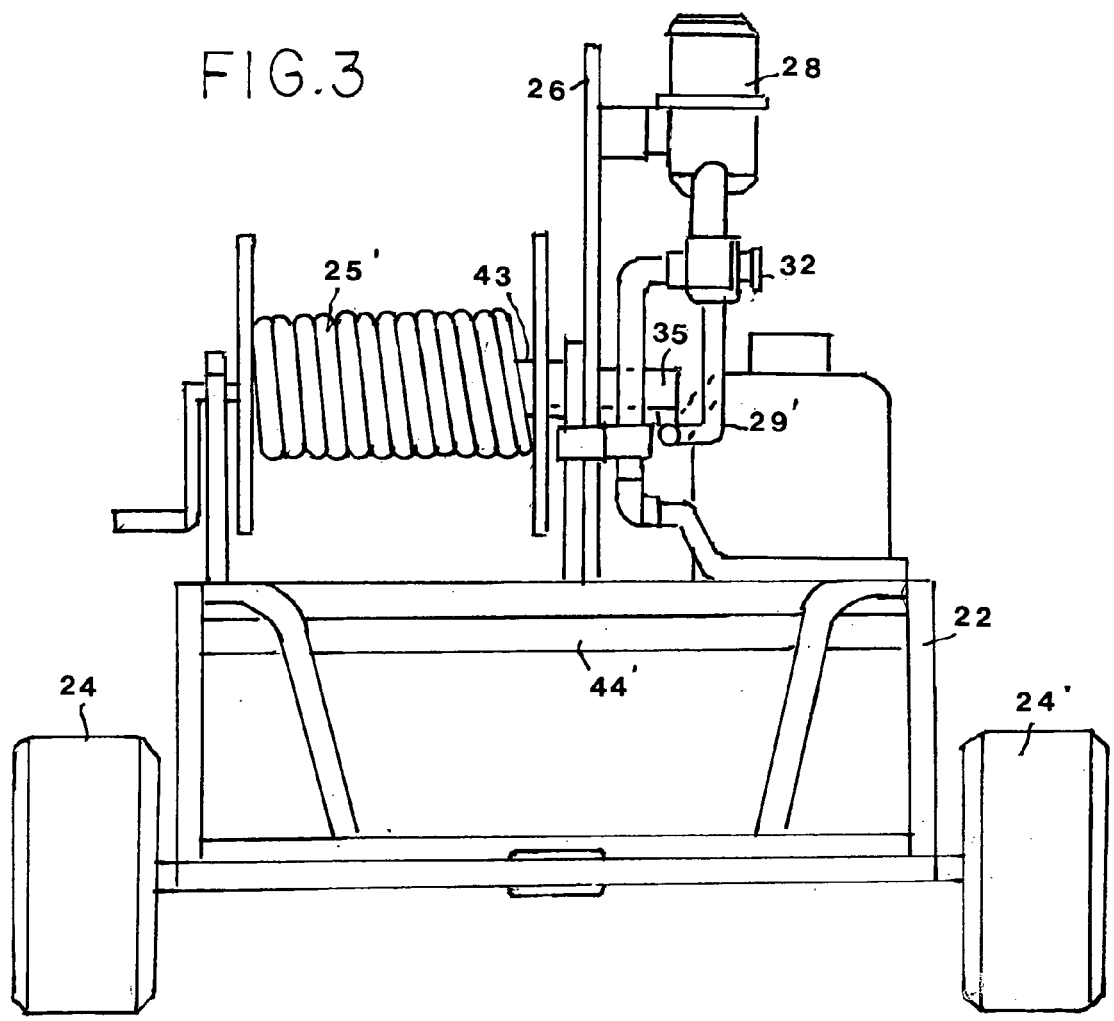
FIG. 3 is a front elevational view of the water chemical spraying invention.
Figure 4:
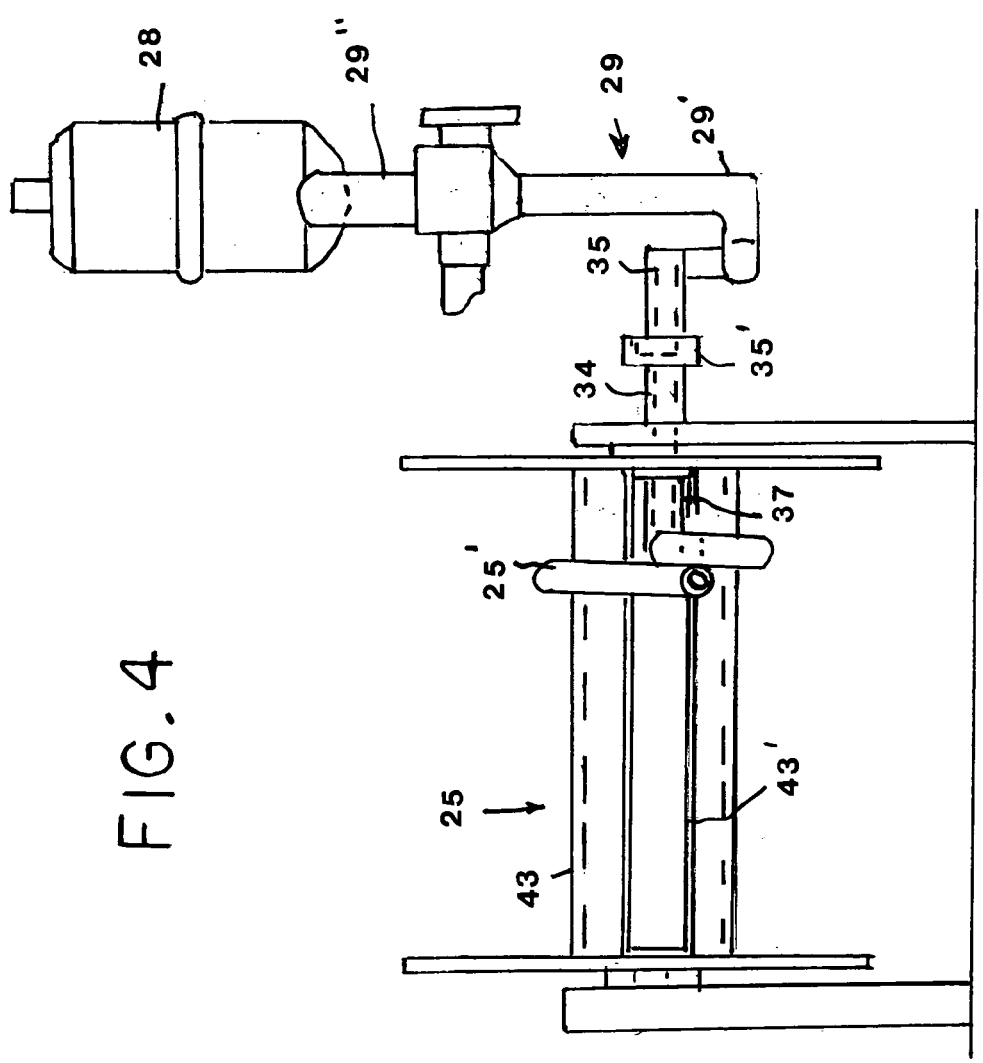
FIG. 4 is a fragmentary front elevational view of the invention with portions cutaway.
Figure 5:
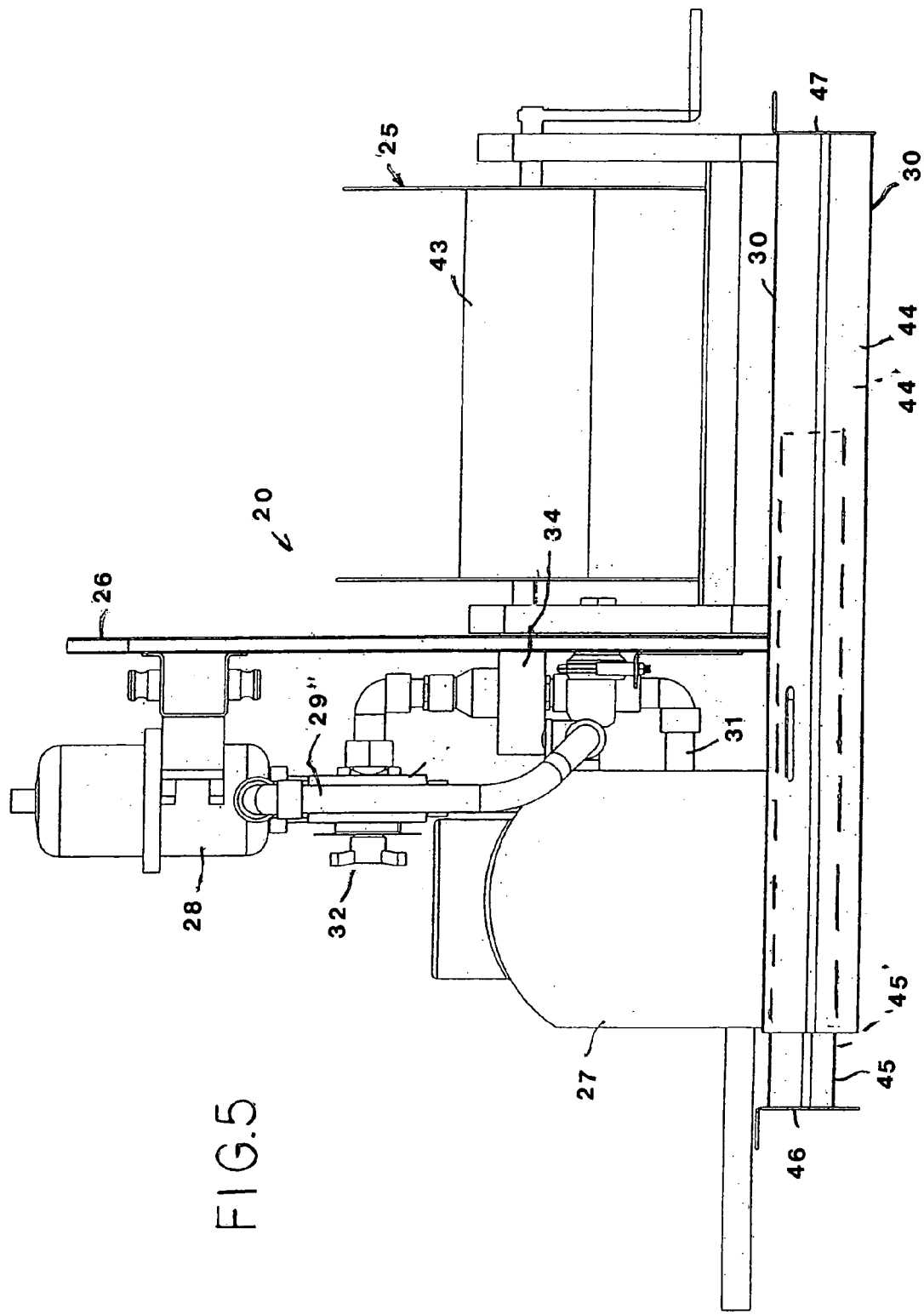
FIG. 5 is a rear elevational view of the spraying invention.

Referring more particularly to the drawings, in FIG. 1 the spraying equipment apparatus invention 20 is illustrated in FIG. 1 for spraying golf course grounds. The invention 20 has a platform 21 and is portable so as to be detachably mounted to a trailer 22 on the trailer frame 22' having side bars 23 and 23' with wheels 24 and 24' and towed by a tractor. It may also be mounted directly to a small tractor having side bars, not shown, for carrying the platform about the course. The platform 21 has a rotatably mounted spool 25 on the platform for winding and unwinding a garden hose 25' thereon.

A inverted U shaped handle 26 is fixed to the platform 21 and projects upward for using in manually carrying the platform 21 onto the frame 22' of the trailer, when mounting the platform to the trailer. A fluid tank 27 is fixed to the platform containing fluid chemicals for treating the grounds, and a water driven mixing chamber 28 is also mounted to the platform to mix the chemicals in the tank with water from one of the various spigots placed about the course. Control piping 29 is also mounted on the platform. A second hose (not shown) is provided on the platform to pipe water from one of the spigots on the course into the inlet pipe 31 of the control piping 29 of the platform.

The control piping 29 on the platform has two control pipe line branches 29' and 29' for controlling the receiving of water from one of the spigots into a inlet pipe 31 to a two position valve 32, which valve directs the water into one of the two branches and from there into the garden hose mounted on the spool. The pipe line branch 29' is for delivering water only to the garden hose 25'. The pipe line branch 29' runs directly to an elbow connection 35 which is connected to one side of the center pipe 34 of the spool 25'. The valve has a third position which turns the water off either branch when spraying is not needed.

The other pipe line branch 29" is for delivering water with a mixture of a chemical additive stored in the fluid tank 27 to the garden hose 25'. The pipe line branch 29" has a filter 36 and the mixing chamber 28 in its line to receive the water traveling along this branch. The water traveling through this line 29" travels through the filter 36 to filter the water of impurities and then travels through the mixing chamber 28 which has a water driven piston operated apparatus driven by the pressure of the water traveling through the chamber to mix chemicals from the tank with the water. The water under pressure from the outlet also creates a venturi effect from the chamber 28 through the pipe line 39 and through the metering sleeve 33 to the chemical tank upon the chemical additives in the chemical tank 27. This venturi effect acts to draw the chemical from the tank 27 up through the pipe line 39 and through the adjustable chemical metering sleeve 33, which meters the ratio amount of chemical reaching the mixing chamber, to the mixing chamber 28 so that the water traveling in this branch 29" is now mixed with the chemicals from the chemical tank 27 in the mixing chamber to a proper selective ratio or mixture, depending upon the setting of the metering sleeve. The mixture continues on in this branch through the elbow connection 35 on the other side of the connection into the center pipe 34 of the spool 25. The center pipe 34 extends into the spool inside the hub 43 of the spool and travels out the elbow 37, which elbow is mounted to the pipe 34 inside the the hub of the spool. The inner end 25" of the hose is mounted to the elbow 37. The garden hose 25' extends out the hub 43 through the slot 43' where it is wound about the hub and, so that the mixture from the chamber 28 can from the out elbow, center pipe and inner elbow can reach the garden hose. From there, the mixture can travel out the garden hose to be sprayed out onto the golf grounds by the hose 25' on the reel or spool 25.

The control line branches 29' and 29" are controlled by the two directional valve 32 for the controlling, whether water from the spigot is delivered out the garden hose 25' of the apparatus through the lower branch 29' without chemical mixture, or whether the water from the spigot is to be delivered through upper branch 29" for mixture with the chemical and then delivered out the garden hose 25' with the chemical mixture of the additive from the tank. The inlet pipe 31 has a pressure regulating valve 40 mounted to the inlet pipe 31 before it reaches the two directional valve which is adjustable to regulate the amount of water pressure in the water traveling through the control piping to maintain the water pressure within certain upper and lower limits.

In operation, the apparatus 20 will be towed by a power vehicle to a portion of the golf course where the grounds are to be with water only or chemically treated and positioned near one of the water spigots on the course near that area and which is near enough for the second hose line 30 to reach the spigot. The garden hose 25' will be preferably of at least a 100 foot length so as to more readily reach the area of the course to be treated. One end of the second hose will be attached to the spigot, while its other end will be attached to the outer end 31' of the inlet pipe 31 of the control piping 29.

If it is desired to apply water only to the selected area of the course, the two position valve 32 of the control piping will be placed in its first position. With the valve in its first position, water coming into the control piping from the inlet pipe 32 will travel through the valve along line 29' directly to the center pipe 34 of the spool. It will travel into the center pipe 34 into the inner end 25" of the hose line 25' wound on the spool. From the there, it will travel out the hose line 25' to deliver water only onto the desired part of the golf grounds. The hose line 25' will have a spray nozzle to control the amount of water from the inlet pipe out the hose line so that the hose line may be unwound and the spray nozzle end moved to a location on the course where water only is intended to the sprayed on the course, and then the spray nozzle will be opened so that the water can be sprayed on the course as desired.

When it is desired to spray water with a chemical mixture, the directional valve will be turned to its second position. When the directional valve 32 is in its second position, water from the inlet pipe will travel from the directional valve up along the line 29" of the control lines through the mixing chamber 28 where the water traveling through will cause a venturi effect upon the chemicals in the tank and will be drawn out of the tank into the mixing chamber 28, where the water mixed with the chemical and then travel into the elbow 35 on the out side of the spool to enter the center pipe 34 from the opposite direction, and water and chemical mixture will travel into the hose line 25. The other end of the hose line 25' may be directed to a location on the course where the water with the chemical mixture is desired to be placed, and the nozzle on the hose line opened so that the water with the chemical mixture may be applied.

The pipe section 34 extends through a center opening 39 in a bearing 40 mounted to the one upright support 41 of the platform which bearing provides a rotational support for the spool. The spool has another bearing 41 mounted in the other disc or flange 42 of the spool which bearing provides a rotational support for the flange to the other upright support 41' mounted to the platform spaced from the first upright support 41.

The pipe section 34 and elbow 37 rotates with the spool. The elbow 37 is fixed to the pipe section 34 which extends through the center opening The pipe section 34 has a watertight rotatable collar connection to the one end 35' of the elbow 35 outside the spool, so that the spool and pipe section 34 and elbow 37 can rotate on spool supports on the upright supports 41 and 41', relative to the elbow 35, which is stationary. The collar connection enables the hose, through the elbow connection 37, pipe connection 34 and elbow 35 to be in fluid communication with branches 29' and 29" of the control piping.

The hub 43 is faxed between the flanges 42 and 42' to fix the flanges together so as to rotate in unison on the upright supports. The hub has the slot 43' to enable the inner end 25" of the hose to extend into the hub and be attached to the elbow 37.

The platform 21 is formed of a top plate 30 with a pair of parallel rectangular tubes 44 and 44' fixed beneath the plate. A pair of rectangular telescoping tubes 45 and 45' are sidably mounted in the tubes 44 and 44' respectively to telescope into and out of the tubes 44 and 44'. A L shaped plate 46 is fixed to the outer ends of the tubes 45 and 451 to engage one side bar 23 of the trailer and a similar L shaped plate 47 is fixed across the tubes 44 and 44' to engage the other side bar 23' of the trailer.

The platform plate 30 has all the components of the apparatus, such as the spool, and control piping, and tank mounted upon its top surface. The pair of tubes 45 and 45' are slidable in or out of the tubes 44 and 44' to adjust the L shaped plate 46 inward and outward so that the L shaped plates 46 and 47 fit between side bars on trailers or tractors having different spacing between them. It further enables the platform to be quickly detachable or attachable to the tractor or trailer.

The one the one tube 44' of the platform has a pin 48 and the tube 45' has a slot 48' to allow the the pin to slide in the slot as the tubes are adjusted inward and outward, and a threaded knob is threaded onto the pin to be tightened against the outside of the tube 45' to lock the tubes in their adjusted position.

Thus it will be seen that a novel portable golf course spraying platform has been provided which enables an operator while on the course to spray a selected portion of the grounds with water for a chemical water mix with the mixing of the water and chemical talking place during the spraying operation so that the water and chemical do not have to be premixed.

It will be obvious that various changes and departures may be made to the invention without departing from the spirit and scope thereof, and accordingly, it is not intended that the invention be limited to that specifically described in the specification, or as illustrated in the drawings, but only as set forth in the appended claims wherein:

What is claimed is:

1. A portable spraying platform for spraying golf course grounds with fluids comprising a frame, a spool rotatably mounted to the frame, said spool having spool piping, a hose having an inner and outer end and wound onto said spool with its inner end connected to said spool piping, a chemical tank mounted on said frame, an inlet hose having one end for attachment to a water outlet on the golf course, control piping on said platform having a first and second branch, a valve for directing water from said inlet hose selectively into either said first or second branch, said first branch being connected directly into said spool piping when water is directed by said valve into the first branch the water may be directed out the other end of the hose onto the golf grounds, said second branch having filter means and chemical mixing means intermediate its ends with its other end connected to said spool piping whereby when water is directed by said valve into said second branch chemicals in the tank will be drawn into the second branch and mixed with the water in the second branch and the mixed water and chemical will be directed by the second branch into the spool piping where the mixture may be directed out the other end of the hose onto the golf course grounds, said platform being formed of two telescoping sections to that the outside dimension of the platform may be adjusted in one direction by telescoping the sections inwardly or outwardly relative to one another, locking means on the platform to lock the sections in their adjusted position;

a vehicle for carrying the platform, said vehicle having parallel bars mounted thereon, said platform having outer channel members on their outside dimension in said one direction opening outward to receive the parallel bars of the vehicle for mounting the platform to the vehicle.

2. A portable spraying platform for spraying golf course grounds with fluids comprising a frame, a spool rotatably mounted to the frame, said spool having spool piping, a hose having an inner and outer end and wound onto said spool with its inner end connected to said spool piping, a chemical tank mounted on said frame, an inlet hose having one end for attachment to a water outlet on the golf course, control piping on said platform having a first and second branch, a valve for directing water from said inlet hose selectively into either said first or second branch, said first branch being connected directly into said spool piping when water is directed by said valve into the first branch the water may be directed out the other end of the hose onto the golf grounds, said second branch having filter means and chemical mixing means intermediate its ends with its other end connected to said spool piping whereby when water is directed by said valve into said second branch chemicals in the tank will be drawn into the second branch and mixed with the water in the second branch and the mixed water and chemical will be directed by the second branch into the spool piping where the mixture may be directed out the other end of the hose onto the golf course grounds, said platform being formed of two telescoping sections to that the outside dimension of the platform may be adjusted in one direction by telescoping the sections inwardly or outwardly relative to one another, locking means on the platform to lock the sections in their adjusted position;

a vehicle for carrying the platform, said vehicle having parallel bars mounted thereon on opposite sides of said vehicle, said platform having adjustable outer parallel channel members on their outside dimension in said one direction opening outward and adjustable outward to receive the parallel bars of the vehicle for mounting the platform to the vehicle.

* * * * *